United States Patent [19]
Allen

[11] Patent Number: 5,848,948
[45] Date of Patent: Dec. 15, 1998

[54] ROLLER CHAIN TIMING DRIVE HAVING REDUCED NOISE

[75] Inventor: Timothy R. Allen, Paris, Ark.

[73] Assignee: Cloyes Gear and Products, Inc., Mentor, Ohio

[21] Appl. No.: 691,350

[22] Filed: Aug. 2, 1996

Related U.S. Application Data

[60] Provisional application No. 60/003,983, Sep. 19, 1995.

[51] Int. Cl.$^6$ ........................................... F16H 7/06
[52] U.S. Cl. .......................... 474/156; 474/212; 474/231
[58] Field of Search ................... 474/152, 153, 474/155, 231, 148, 212, 156

[56] References Cited

U.S. PATENT DOCUMENTS

| | | |
|---|---|---|
| 528,847 | 11/1894 | Briggs . |
| 2,529,168 | 11/1950 | Marshall et al. . |
| 3,377,875 | 4/1968 | Sand . |
| 3,448,629 | 6/1969 | Pfrank et al. ........................ 474/156 X |
| 3,495,468 | 2/1970 | Griffel . |
| 4,016,772 | 4/1977 | Clemens et al. ........................ 474/156 |
| 4,036,071 | 7/1977 | McKnight et al. .................... 74/243 R |
| 4,116,081 | 9/1978 | Luttrell et al. ............................ 474/156 |
| 4,147,069 | 4/1979 | Derner ................................. 474/204 X |
| 4,174,642 | 11/1979 | Martin et al. ............................ 474/156 |
| 4,315,750 | 2/1982 | Kawashima et al. ...................... 74/153 |
| 4,487,088 | 12/1984 | Olson ................................. 474/152 X |
| 4,758,209 | 7/1988 | Ledvina ................................. 474/156 |
| 4,867,733 | 9/1989 | Yamanoi et al. ........................ 474/161 |
| 5,192,252 | 3/1993 | Skurka et al. ............................ 474/210 |
| 5,397,278 | 3/1995 | Suzuki et al. ............................ 474/156 |

Primary Examiner—Roger Schoeppel
Attorney, Agent, or Firm—Fay, Sharpe, Beall, Fagan, Minnich & McKee

[57] ABSTRACT

A roller chain timing drive reduces noise by thinning the teeth and elongating the root land in between each pair of teeth. Specifically, through detailed calculation, the root land is elongated resulting in a reduced thickness of the teeth as measured across itself from a drive flank to a coast flank. The result is maintained contact of all rollers wrapped around a sprocket throughout the entire design life of the chain and sprockets which reduces noise.

14 Claims, 5 Drawing Sheets

ROLLER CHAIN TIMING DRIVE HAVING REDUCED NOISE

This patent application claims priority from U.S. provisional patent application 60/003,983 which was filed on Sep. 19, 1995.

BACKGROUND OF THE INVENTION

The subject invention is directed to roller chain timing drives, and more particularly, to timing sprockets and chains operable to produce reduced noise. Specifically, the present invention relates to chain timing drives having added backlash resulting from reduced or thinned sprocket teeth.

Chain drives as used in timing operations involve a timing chain wrapped around two or more sprockets of either a drive, driven or idler design. An example is shown in FIG. 1 where the larger driven sprocket has a larger wrap angle than the smaller drive sprocket. Each sprocket has a plurality of teeth thereon where the number of teeth is variable based upon the user's preference or intended use. In between these teeth are a plurality of bottom lands defined as the surface of the sprocket between the fillets of adjacent teeth.

Each tooth is defined by a drive side tooth surface and a coast side tooth surface either intersecting in some embodiments at a point, or connected in most embodiments by a top land. The top land is the top surface relatively flat surface of each tooth. The drive side and coast side tooth surfaces each include a flank and a fillet. The flank being the portion of the tooth between the point or top land and the tangent point with the fillet, while the fillet is otherwise known as the seating curve.

The combination of the teeth on the sprocket defines various overall sprocket dimensions including tip diameter, root diameter, and pitch diameter. The tip or outside diameter is defined as the diameter across a hypothetical circle defined by the cumulation of the top lands of all of the teeth, i.e., where an even number of teeth exist, the tip diameter is the distance from one tooth tip to another tooth tip diametrically opposed thereto. Each sprocket also has a minor diameter referred to as the root diameter defined as the diameter extending across a hypothetical circle defined by the cumulation of the bottom lands of all of the teeth, i.e., the diameter of a circle tangent to the seating curve at the bottom of the tooth gap. The pitch diameter is a theoretical dimension is later defined. The operating pitch radius is half of the diameter of an operating pitch circle which is defined as the distance from the center point of the sprocket known as the gear axis to the center point of a fully seated roller on a chain when the chain is wrapped around the sprocket.

Tooth and sprocket designs are typically governed by one of the numerous conventions or standards including ANSI, ISO, British, DIN (German) and other national and international standards. One such standard is the American National Standard, or ANSI standard, as described in ANSI specifications and summarized in Marks' Standard Handbook For Mechanical Engineers on the pages directed to chain drives and design of sprocket teeth for roller chains (as shown in FIG. 2). This discussion explains the ANSI standards for tooth design to maximize efficiency throughout life of the chain drive. This is one conventional manner in which sprocket teeth have been designed and manufactured for years.

Another such generally accepted and widely used standard is the International Standard, or ISO standard (as shown in FIG. 3). The variables as shown in FIG. 3 are critical to the definition of the ISO standard sprocket and are as follows P=chain pitch, P.D.=pitch-circle diameter, $D_1$=maximum roller diameter, $R_i$=roller seating radius or fillet radius, α=roller seating angle, $R_f$=tooth flank radius, O.D.=tip diameter, $D_2$=root diameter, and Z=number of teeth.

In the case of both widely used standards, each tooth is symmetrical in nature and the minor or bottom diameter between adjacent teeth is defined by one continuous roller seating or fillet radius.

In any case, whether the tooth profiles are ISO, ANSI, or others, typically, portions of the sprocket tooth profiles are involute in nature because the involute curve provides numerous advantages and properties well known in the art. One list of some of these properties is found in the twenty-fifth edition of the Machinery's Handbook in the section on gearing.

As exemplified in FIG. 4, the standard tooth design of a roller chain sprocket 10 has a tooth space 12 having a continuous fillet radius from one tooth flank 14 to the adjacent tooth flank 16. In order for the roller chain 18 to fully seat in a sprocket tooth, the chain must have the same pitch as the sprocket. This, of course, is not practical because of manufacturing tolerances. Accordingly, industry standards suggest that the chain have a pitch which is slightly greater than the sprocket wheel. Moreover, a worn chain theoretically has a longer pitch than a new chain. Thus, after extended use, the pitch length of the roller chain is altered.

It is also generally known in the art that one major source of noise is the chain contacting the teeth of the sprocket. One technique that reduced noise in roller chain timing drives resulted from altering the root diameter of a standard sprocket. The standard sprocket tooth design is shown in FIG. 4. In this modification to reduce noise, a standard sprocket is modified to accommodate, or fit, a ⅜ inch pitch chain on an engine that was designed to accommodate a ½ inch pitch chain, i.e., the engine center distance does not match the theoretical center distance for a ⅜ inch pitch chain. This sprocket modification is achieved by reducing the root diameter relative to a standard sprocket design. As a result, noise is reduced for a roller chain timing device.

However, it is generally known that it is desirable to maintain the rollers in contact with the root diameter. This technique of altering the root diameter does reduce noise but does not satisfy this need to maintain rollers in contact with the root diameter throughout of the life of the chain and sprockets.

SUMMARY OF THE INVENTION

In general, it is desirable and advantageous to maintain the rollers in contact with the root diameter throughout the life of the chain and sprockets. As opposed to the prior noise reducing solution of reducing the root diameter of the sprocket to accommodate a different size roller chain, the present invention adds backlash to the system by reducing or thinning the sprocket teeth.

Specifically, the present invention is a chain drive assembly for reducing noise having a chain and a sprocket. The sprocket has a number of peripherally spaced teeth. Each tooth on the sprocket is reduced in thickness as measured across a tooth from a drive flank to a coast flank of the tooth. The amount of thinning is selected on the basis of compensating for actual pitch of the chain so that the chain and sprocket remain in contact.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred alternative embodiments and methods of which will be described in detail in this specification and illustrated in the accompanying drawings which form a part hereof, and wherein.

DETAILED DESCRIPTION OF THE PREFERRED EMBODIMENT

Figure 5:
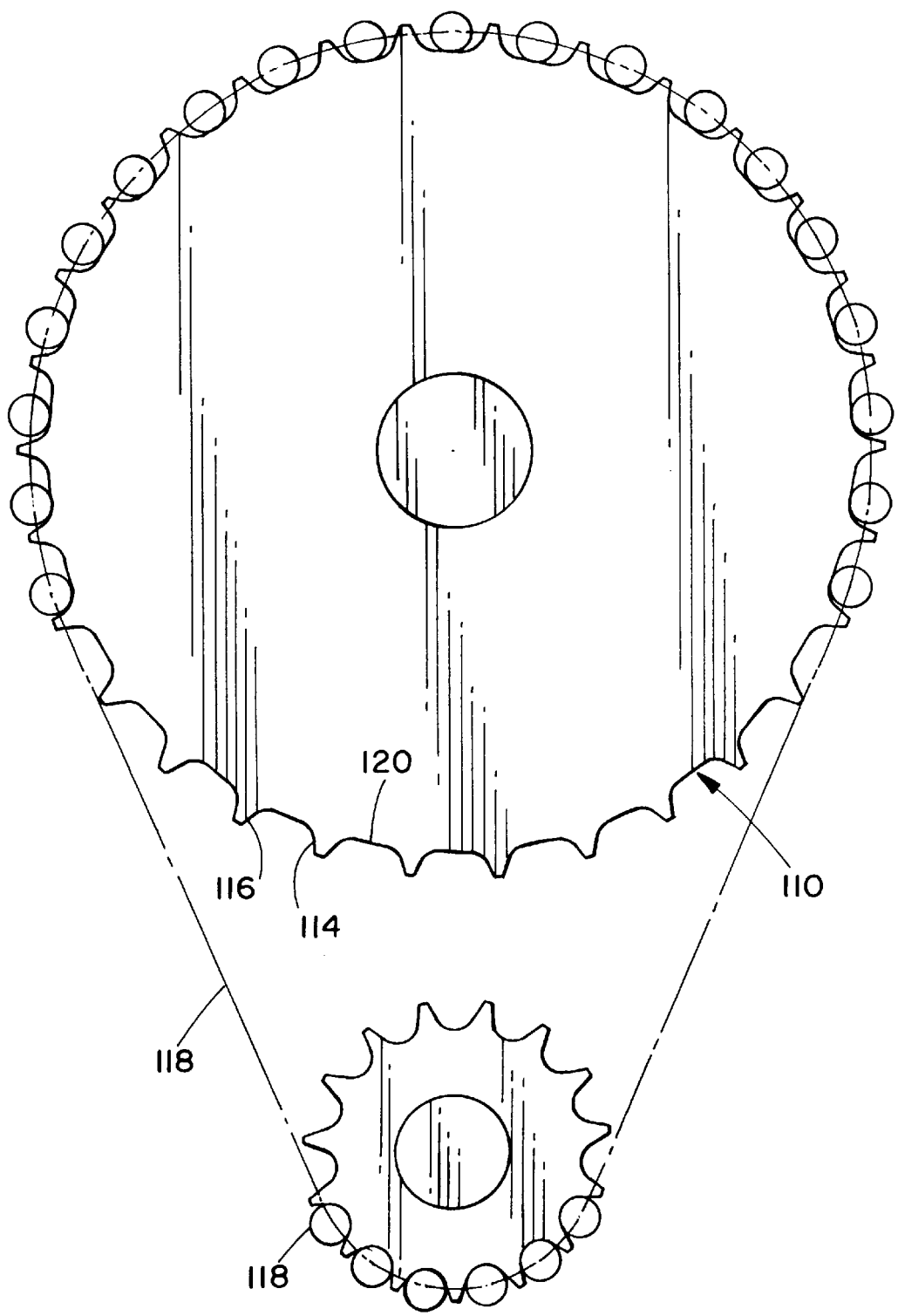
FIG. 5 shows the present invention in an exaggerated format displaying the chain remaining tightly wrapped around the complete chain wrap even after wearing.

Referring now to the drawings wherein the showings are for the purposes of illustrating the preferred embodiment of the invention only and not for purposes of limiting, the overall arrangement of the preferred construction of a sprocket 110 for use with a timing chain 118 as is generally shown in FIG. 5 (in an exaggerated fashion) which shows a crank shaft sprocket disposed below a smaller cam sprocket.

The invention is a sprocket design that forces the rollers tight against the root diameter so that the chain does not climb up the sprocket as the chain wears, i.e., specifically so that the rollers on the chain do not climb up the flank and then the face of the teeth in the wrap area. This result occurs by adding backlash to the new chain in an amount equivalent to assure that the chain once worn to its design life will have closed all of the backlash but still be tight against the root diameter, i.e., the chain will have stretched and worn to the point of almost climbing up the sprocket.

As indicated above, ISO standard teeth are designed to supply relatively tight roller-tooth contact when a chain is new. However, as the chain wears, the rollers come out of tight contact resulting in proper engagement between the teeth and rollers at only the chain wrap entrance and exit spots. The result of this poor contact is increased noise and wear due to rattling of the chain in the middle of the wrap.

As mentioned above, in response to these problems with the ISO standard (and other standards) is sprocket modification resulting in a reduced root diameter. This reduction is problematic because the sprocket fails to meet required design and performance standards such as that of ISO.

The present invention solves the above mentioned problems of supplying and maintaining roller-tooth contact throughout the wrap as the chain and sprocket wear without reducing the root diameter while continuing to meet all ISO design and performance standards.

Figure 1:
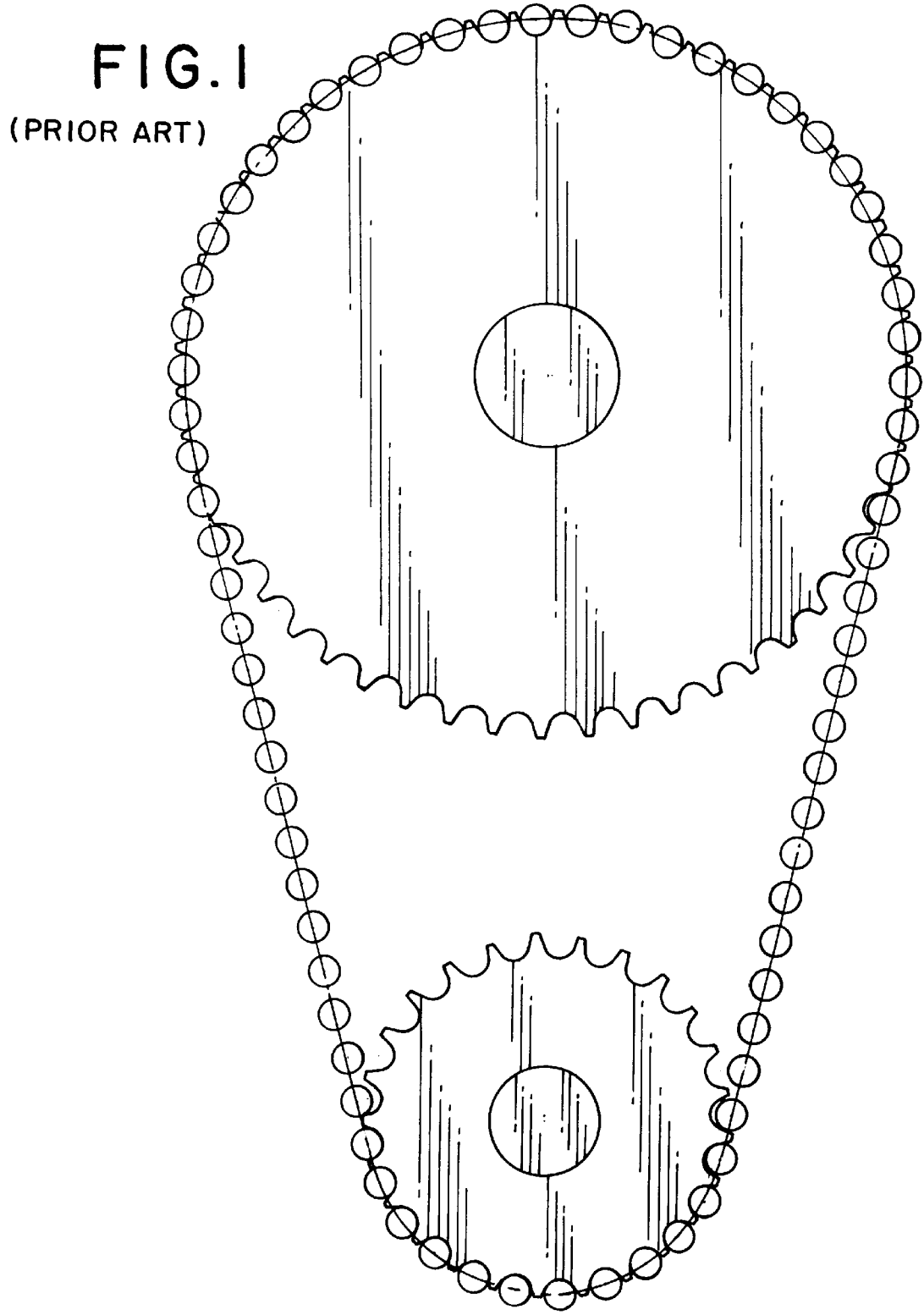
FIG. 1 shows a standard timing chain drive having two sprockets and one chain wrapped therearound.
Figure 2:
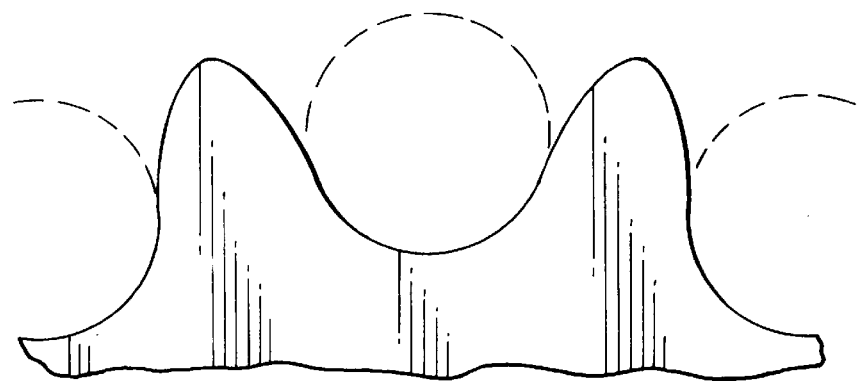
FIG. 2 shows an ANSI standard tooth.
Figure 3:
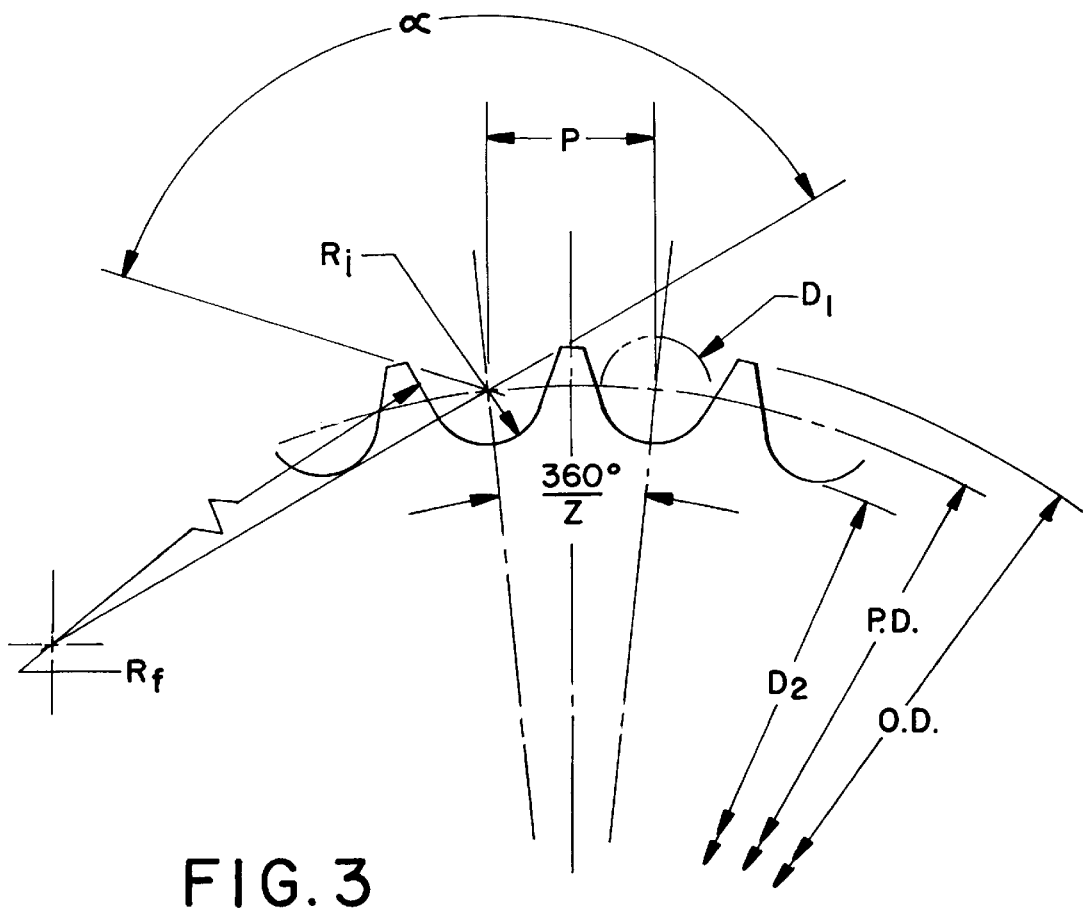
FIG. 3 shows an ISO standard tooth.
Figure 4:
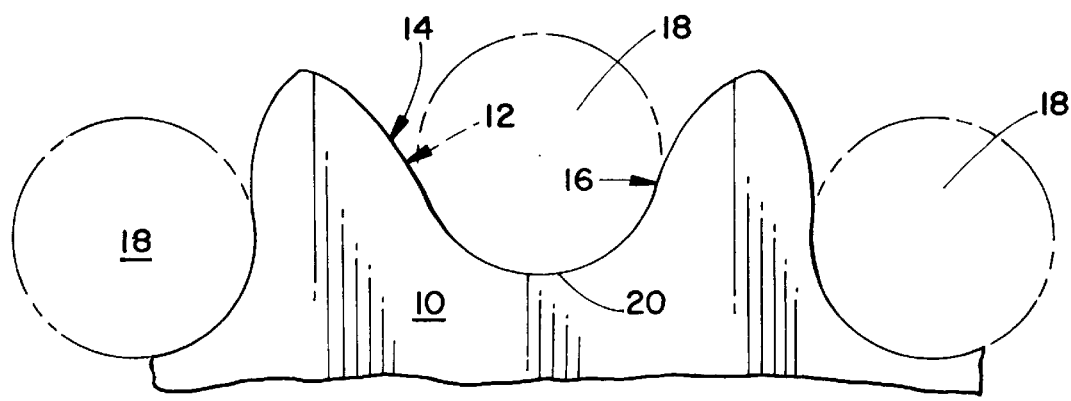
FIG. 4 shows an axial view of a standard tooth design of a prior art roller chain sprocket with a tooth space having a continuous fillet radius from one tooth flank to the adjacent tooth flank.
Figure 6:
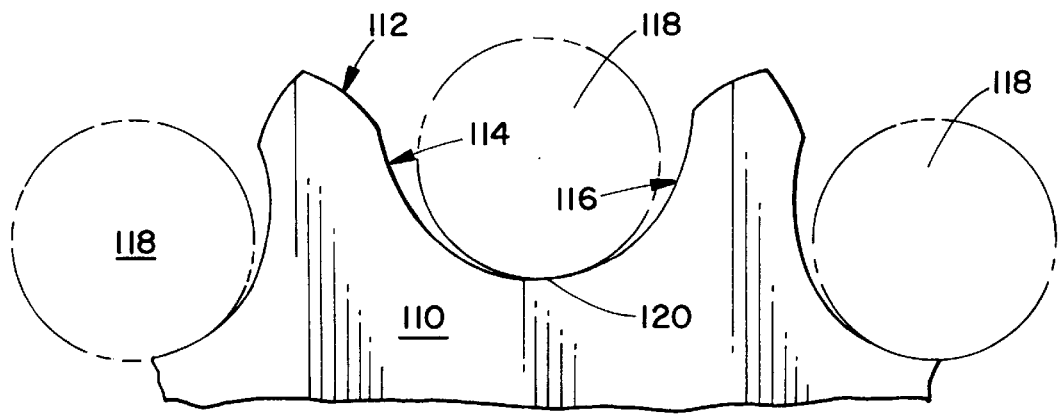
FIG. 6 shows an axial view of the present invention tooth design with the thinned teeth.
Figure 7:
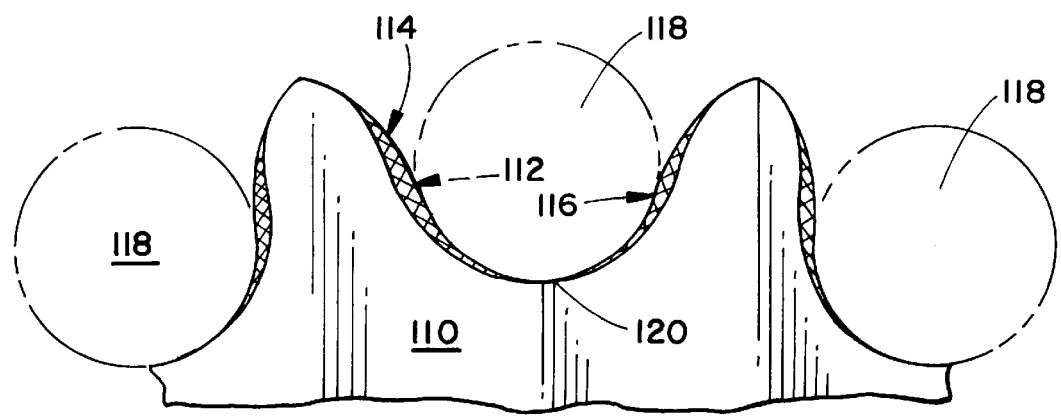
FIG. 7 shows the thinning of the teeth according to the formula of the present invention whereby the thinning is shown in cross hatched lines.

Specifically, each sprocket tooth 112 is thinned along the flank radius 114, 116 as shown in FIG. 6, and as represented in exaggerated form by the cross-hatching in FIG. 7 while the root diameter is maintained the same. This thinning of the tooth builds in a backlash when compared to the theoretical sprocket design. Since the root land is elongated, the chain is in hard contact with the root diameter of the sprocket throughout the entire chain wrap. It will be understood that the inventive aspects reflected in FIG. 6 and FIG. 7 find equal application to both driving and driven sprockets.

In point of fact, the chain wrapped around standard non-thinned sprockets is usually in hard contact with a standard sprocket root diameter only at the immediate area of entry and exit and not over the remainder of the wrap angle. In addition, chain wear and elongation when used on these standard non-thinned sprockets further loosens the chain wrap in the non-entry and non-exit regions. Stated another way, this means there is no backlash in the standard non-thinned sprocket. Moreover, near the central portion of the wrap, the chain is able to leave contact with the sprocket. This loose condition over the central portion results in the chain rollers rattling against their bushings and against the sprocket teeth—a major source of noise.

By thinning the sprocket teeth in accordance with the present invention, backlash is built into the sprocket so that the chain and sprocket remain in contact. A key to this technique is to thin the sprocket teeth a calculated amount to compensate for the actual pitch of the chain (as opposed to the original or theoretical pitch). The actual pitch of the chain may differ from theoretical pitch by up to 0.3 percent. The resultant space between adjacent sprocket teeth has a circular root portion 120 that is concentric with the rotational axis of the sprocket and is tangent with the fillet radii which blend into the tooth flanks. This is shown in exaggerated form in FIG. 6.

Figure 8:
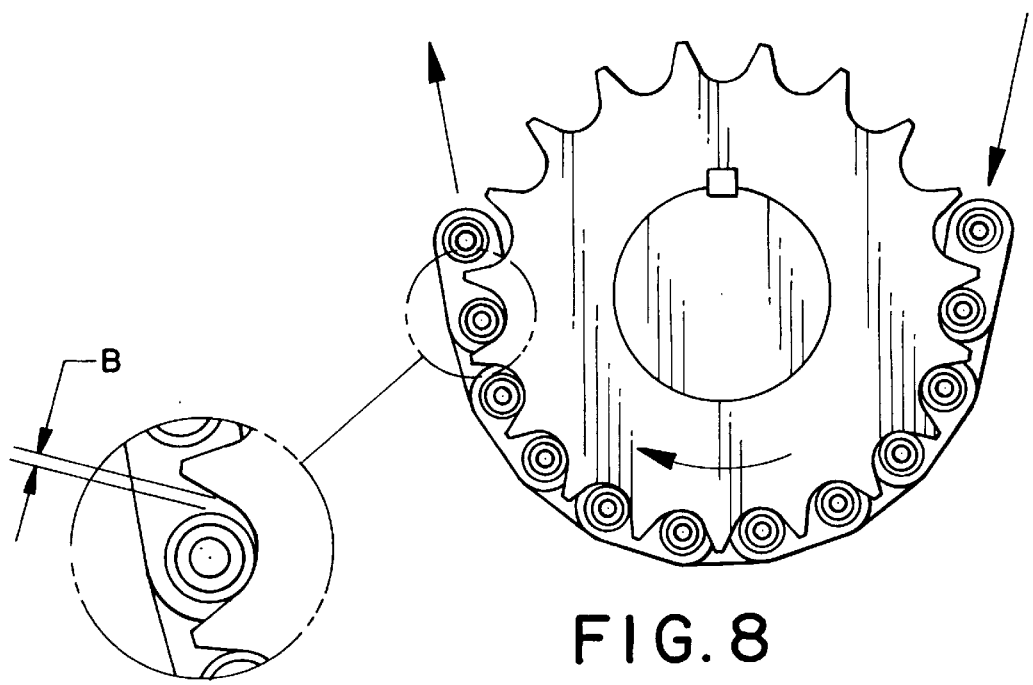
FIG. 8 shows backlash in a new chain wrapped around a sprocket employing the present invention ; and, FIG. 9 shows backlash in a worn chain at the end of its design life that is wrapped around a sprocket employing the present invention.
Figure 9:
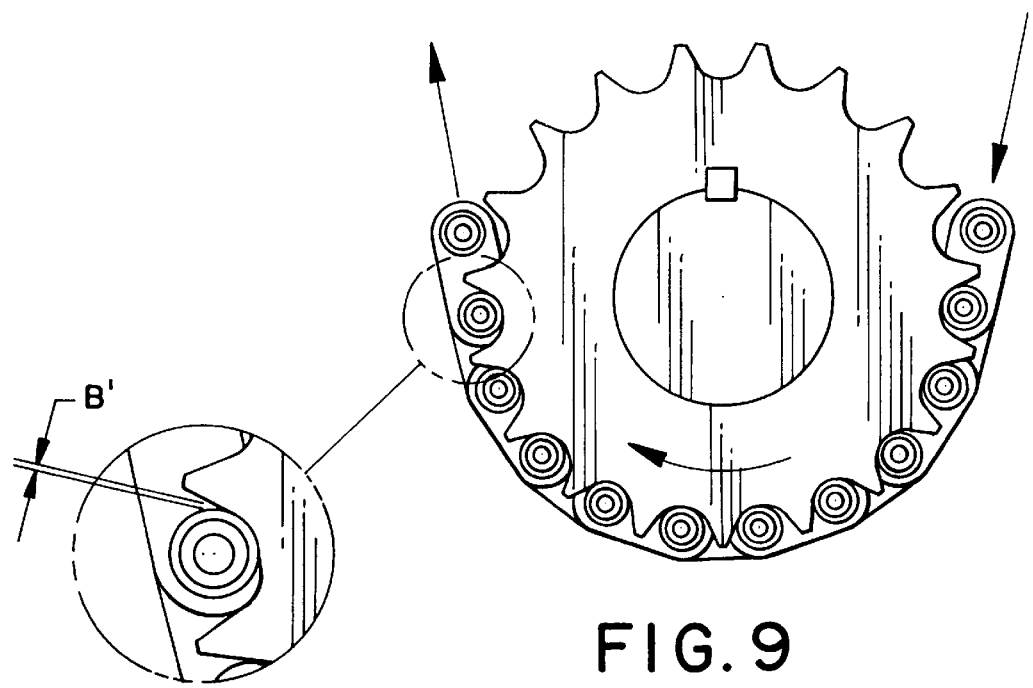

This thinning to build in backlash is shown in FIGS. 8 and 9, which depict a crank shaft sprocket that drives a larger camshaft sprocket. Specifically, FIG. 8 shows the backlash B of the present invention as is built into the sprocket design. This backlash is correlated to the expected wearing over the expected design life such that at the end of the expected life, all of the backlash has been used up but the rollers are still in tight contact with the chain, i.e., the rollers have not begun to climb up the teeth faces. This elimination of backlash at the end of the expected life is shown in FIG. 9 as B'.

The amount that the teeth are thinned is calculated based on the allowable chain wear, the angle through which the chain wraps around the sprocket during operation, and the desired operating pitch diameter of the sprocket. A formula for determining the amount of tooth thinning is given by:

$$\Delta TT = WA \cdot \frac{SPD - APD}{2}$$

Where:

$\Delta TT$=Amount teeth are to be thinned

WA=Chain Wrap Angle in Radians

SPD=Pitch Diameter (PD) based upon Actual Chain Pitch plus predetermined backlash APD=Actual (Operating) Pitch Diameter This thinning is used in conjunction with the pitch diameter to define a sprocket with reduced noise. Pitch diameter is calculated using the following formula:

$$PD = \frac{P}{\sin°\left(\frac{180}{n}\right)}$$

Where:
PD=Sprocket Pitch Diameter
P=Chain Pitch
N=Number of Teeth in Sprocket) Thus, the exaggerated form of sprocket is shown in FIG. 7 and can be incorporated into various forms of timing drive layouts including all known drives on the market including drives having more than two sprockets. Stated another way, a desired worn chain pitch is selected (pitch elongation of approximately 0.15 percent for a worn chain), and this amount is divided over the number of teeth in engagement with the chain, i.e., the wrap angle, and the teeth are then thinned accordingly. By designing the backlash into the system, the chain rollers remain in contact with the sprocket root diameter and the main source of noise associated with the chain contacting the sprocket teeth is reduced.

Basically, this backlash concept compensates for chain elongation that is particularly relevant over time by thinning the flank and/or face of each tooth without affecting the bottom land (thereby not affecting the root diameter). The thinned teeth as thinned according to the formula remove the variability supplied by the worn chain. However, the root diameter remains unchanged and thus remains within the realm of whatever standard, such as ISO, is called for therefore assuring that the sprocket remains within industry standard tolerances.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A chain drive assembly comprising:
a sprocket including a plurality of sprocket teeth each having a drive flank and a coast flank, and having a thickness measured along a pitch circle from the drive flank to the coast flank;
each drive flank cooperating with an adjacent coast flank to define a tooth space having an arcuate surface that is concentric with a rotational axis of the sprocket;
a root diameter value of the sprocket being defined as the diameter of a circle having a circumference laying on each arcuate surface, the root diameter value satisfying at least one of ANSI, ISO, British, and DIN standards;
a chain including rollers for engaging the sprocket teeth, the chain having a initial chain pitch value defined as a distance between the centers of adjacent rollers thereof, and having a worn chain pitch value which is greater than the first chain pitch value, the worn chain pitch value being the anticipated chain pitch when the chain reaches the end of its useful life; and
the thickness of each sprocket tooth being determined based on at least a difference between the initial chain pitch value and the worn chain pitch value, the thickness of each sprocket tooth permitting the rollers to maintain contact within the respective tooth spaces as the chain pitch varies from the initial chain pitch value to the worn chain pitch value.

2. The chain drive assembly of claim 1, wherein each tooth space further includes a first fillet radius tangent to a radially inner end of the first tooth drive flank, a second fillet radius tangent to a radially inner end of the second tooth coast flank, and the arcuate surface being tangent to the first fillet radius at one end thereof the tangent to the second fillet radius at a second end thereof.

3. The chain drive assembly of claim 1, wherein the worn chain pitch value is about 0.03 percent greater than the initial chain pitch value.

4. The chain drive assembly of claim 1, wherein the chain pitch elongates from the initial chain pitch value to the worn chain pitch value over a prolonged period of use.

5. The chain drive assembly of claim 4, wherein the thickness of the sprocket teeth provide backlash within the tooth spaces so that the rollers maintain contact with the sprocket as the chain pitch elongates from the initial chain pitch value to the worn chain pitch value.

6. The chain drive assembly of claim 1, wherein the sprocket is a crank shaft sprocket of a chain timing drive.

7. The chain drive assembly of claim 1, wherein the sprocket is a cam sprocket of a chain timing drive.

8. The chain drive assembly of claim 1, wherein the chain defines a wrap angle with the sprocket, and wherein the thickness of the sprocket teeth are reduced by an amount defined by:

$$WA((SPD-APD)/2)$$

where WA is the chain wrap angle in radians, SPD is the sprocket pitch diameter based upon the worn chain pitch value plus a predetermined amount of backlash, and APD is the sprocket pitch diameter based upon the initial chain pitch value.

9. A chain drive assembly comprising:
a first sprocket and a second sprocket each including a plurality of sprocket teeth each having a drive flank and a coast flank, and having a thickness measured along a pitch circle from the drive flank to the coast flank wherein adjacent sprocket teeth cooperate to define tooth spaces;
the tooth spaces of at least one of the first and second sprockets having an arcuate surface that is concentric with a rotational axis of the at least one of the first and second sprockets, a root diameter value of the at least one of the first and second sprockets being defined as the diameter of a circle having a circumference laying on each of the arcuate surfaces, the root diameter value satisfying at least one of ANSI, ISO, British, and DIN standards;
a closed-loop chain including rollers for engaging the sprocket teeth, the chain having an initial chain pitch defined as the distance between the centers of adjacent rollers thereof and having a worn chain pitch value which is greater than the initial chain pitch value, the worn chain pitch value being the anticipated chain pitch when the chain reaches the end of its useful life; and
the thickness of the sprocket teeth of the at least one of the first and second sprockets being determined based on at least a difference between the initial chain pitch value and the worn chain pitch value to permit the rollers to maintain contact within the respective tooth spaces as the chain pitch varies from the initial chain pitch value to the worn chain pitch value.

10. The chain drive assembly of claim 9, wherein the worn chain pitch value is about 0.3 percent greater than the initial chain pitch value.

11. The chain drive assembly of claim 9, wherein the chain pitch elongates from the initial chain pitch value to the worn chain pitch value over a prolonged period of use.

12. The chain drive assembly of claim 11, wherein the thickness of the sprocket teeth of the at least one of the first and second sprockets provides backlash within the respective tooth spaces so that the rollers maintain contact with the respective sprocket as the chain pitch elongates from the initial chain pitch value to the worn chain pitch value.

13. The chain drive assembly of claim 9, wherein the first sprocket is a crank shaft sprocket of a chain timing drive, and the second sprocket is a cam sprocket of a chain timing drive.

14. The chain drive assembly of claim 9, wherein the chain defines a wrap angle with the at least of the first and second sprockets, and wherein the thickness of the sprocket teeth of the at least of the first and second sprockets are reduced by an amount defined by:

$$WA((SPD-APD)/2)$$

where WA is the chain wrap angle in radians, SPD is the sprocket pitch diameter based upon the worn chain pitch value plus a predetermined amount of backlash, and APD is the sprocket pitch diameter based upon the initial chain pitch value.

* * * * *